United States Patent [19]

Sekelsky, Jr.

[11] Patent Number: 4,669,161
[45] Date of Patent: Jun. 2, 1987

[54] CLAMPING SYSTEM

[75] Inventor: Edward M. Sekelsky, Jr., Oxford, Conn.

[73] Assignee: Avco Corporation, Greenwich, Conn.

[21] Appl. No.: 768,357

[22] Filed: Aug. 22, 1985

[51] Int. Cl.⁴ .......................... B23Q 3/00; B23Q 7/04
[52] U.S. Cl. ..................................... 29/33 P; 29/563;
 269/23; 269/25; 269/30; 294/88; 294/119.1;
 410/77
[58] Field of Search .................. 29/33 P, 563; 269/23,
 269/24, 25, 26, 27, 30, 216, 218; 279/4; 410/2,
 52, 77; 294/88, 119.1; 244/118.1, 137 R

[56] References Cited

U.S. PATENT DOCUMENTS

| | | | |
|---|---|---|---|
| 2,338,603 | 1/1944 | Schultz | 269/26 |
| 2,849,907 | 9/1958 | Moosman | 269/30 |
| 2,916,883 | 12/1959 | Geck | 269/26 |
| 3,420,148 | 1/1969 | Doerfer et al. | 269/26 |

FOREIGN PATENT DOCUMENTS

| | | | |
|---|---|---|---|
| 158718 | 2/1983 | German Democratic Rep. | 294/88 |
| 562946 | 3/1957 | Italy | 269/25 |
| 606232 | 7/1960 | Italy | 269/25 |
| 134630 | 8/1984 | Japan | 269/25 |

*Primary Examiner*—Gil Weidenfeld
*Assistant Examiner*—Daniel W. Howell
*Attorney, Agent, or Firm*—Perman & Green

[57] ABSTRACT

A clamping system is provided for securing a part to be machined to a fixture so that the fixture and part can be transported as an entity from work station to work station and the part subjected to successive machining operations safely and efficiently. The fixture incorporates a hydraulic system comprising hydraulically actuated means for quickly positioning the part and clamping it securely to the fixture without a high degree of dependence on human judgement. Fluid under pressure actuates the hydraulic means, each element of which is isolated by check valves from the rest of the system so that failure of any one element of the system does not jeopardize the safety of the part being machined or of personnel supervising the machining operations.

7 Claims, 2 Drawing Figures

CLAMPING SYSTEM

BACKGROUND OF THE INVENTION

Fixtures for holding parts to be machined are widely employed for accurately positioning and holding the parts during machining operations. In modern machine shops, parts are frequently moved from one work station to another where successive machining operations are performed. Transporting the parts between work stations and accurately positioning them for each operation to be performed are best accomplished by securing each part to a fixture so that the part and its associated fixture are moved as an entity from work station to work station.

In some machining operations, the fixture and the part secured to it are rotated at high speed relative to a fixed cutting tool. To assure the safety of personnel operating the machine tools and to protect the part being machined, it must be held tightly to the fixture. If the parts are manually bolted to the fixtures, the possibility of human error, with grave consequences, is present. Further, bolting the parts to the fixtures is time-consuming and costly.

The present invention provides a system for securing a part to a fixture by use of a plurality of clamps operated by fluid pressure. It is highly efficient with fail-safe features that provide a high degree of reliability independent of human judgement.

SUMMARY OF THE INVENTION

The preferred embodiment of the present invention is described in association with an automated machine shop having a plurality of work stations for performing successive machining operations on complex parts. Each part is secured to a fixture which is transported from work station to work station. When the part is being transported, as well as during machining operations, the part and its fixture are handled as an entity.

The part is first positioned properly relative to the base of the fixture and then clamped securely in place by use of a plurality of hydraulically actuated clamps mounted on the base around the periphery of the part. Fluid under pressure is supplied to the clamps through associated check valves which isolate each clamp from the rest of the system. In this way, failure of any one clamp or of the means supplying the fluid will not affect any other clamp, and danger of the part becoming loose from its fixture is minimized, if not eliminated.

The system is unique in that it can be charged with fluid under pressure and still retain its charge after it is separated from the source of fluid. This makes the fixture, with part affixed, an independent entity that can travel between work stations without dependence upon any power source or fluid supply. When all machining operations have been completed, the pressure in the system can be relieved and the part released from the fixture.

Since all of the support, positioning and clamping mechanisms are hydraulically actuated, no adjustments need be made manually. This reduces risk from tampering or operator error. By isolating each of such mechanisms, the system is substantially fail-safe.

DESCRIPTION OF THE DRAWINGS

The invention is described in more detail below with particular reference to the attached drawings in which.

DESCRIPTION OF OPERATING ENVIRONMENT

Figure 1:
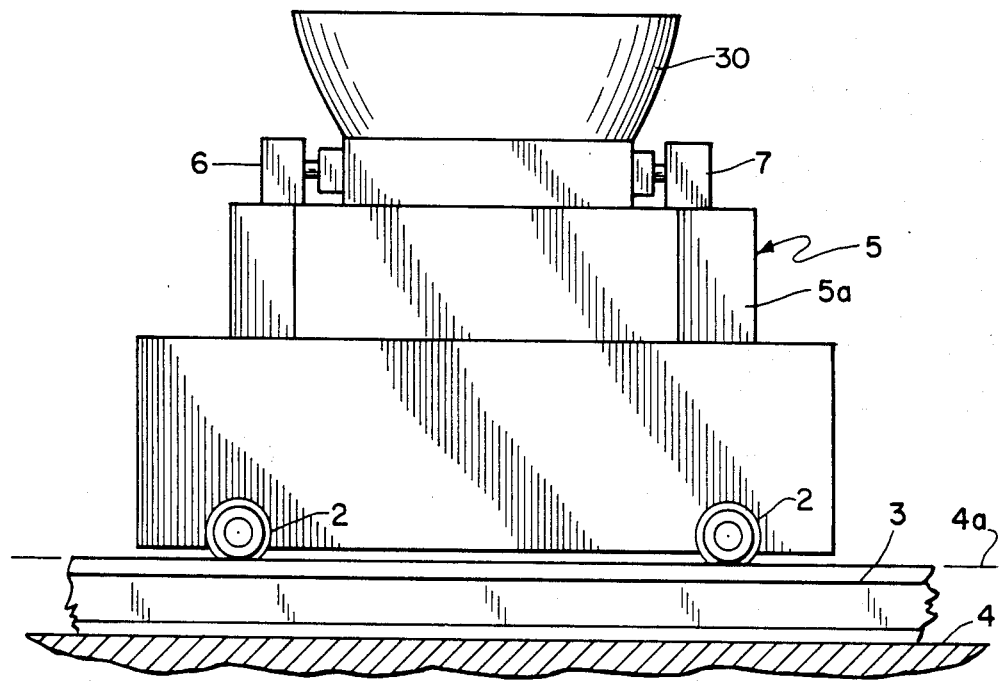
FIG. 1 is a simplified drawing of a part secured to a fixture being borne on a dolly between work stations.

Referring first to FIG. 1, there is shown a dolly 1 supported by wheels 2 for movement along track 3. The track is supported by foundation 4 located below the level of machine shop floor 4a. The dolly is drawn from between work stations in the machine shop by a moving chain (not shown) located below the floor.

Resting on the dolly is a fixture, generally designated 5, incorporating the elements of the present invention, as will be described shortly. Clamps 6 and 7, comprising elements of the invention, are shown in engagement with a part 30 to be machined successively at each work station. It should be noted that the part is clamped to the fixture while being transported and throughout the machining process.

DESCRIPTION OF CLAMPING SYSTEM

Figure 2:
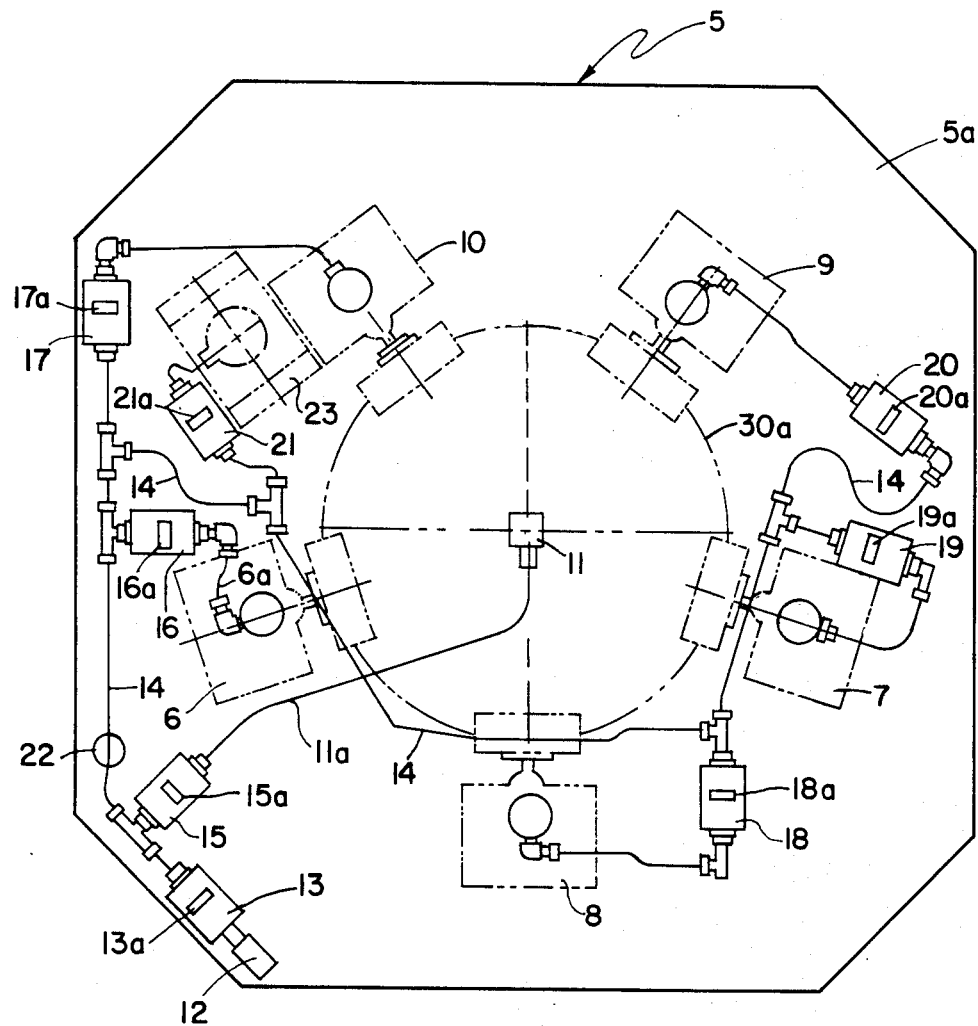
FIG. 2 is a schematic diagram showing the top view of a fixture incorporating hydraulic elements comprising the novel system of the present invention.

Attention is now directed to FIG. 2 showing the top view of the fixture, the cast-iron base of which is designated 5a. For clarity, the part 30 has not been shown, being represented instead by a broken-line circle 30a. Surrounding the periphery of the circle in position to engage the part is a plurality of hydraulically actuated clamps, designated 6 through 10. The clamps are a single acting spring-biased type which are rigidly mounted on base 5a. To distinguish the clamps from other elements of the system to be described, they are shown in broken-lines.

A hydraulic chuck 11, secured to base 5a, may be actuated by hydraulic fluid under pressure, as will be described, to position the part relative to the base.

Hydraulic fluid under 3000 pounds per square inch pressure is supplied to the system through a self-sealing coupling 12 from a source (not shown). From the coupling, the fluid flows through an inlet check valve 13 to a supply pipe, typically high pressure stainless steel tubing, designated 14. From the supply pipe, the fluid is supplied to a plurality of check valves, designated 15 through 21. Check valve 15 is in fluid communication with hydraulic chuck 11 through pipe 11a. Check valve 16 is in fluid communication with hydraulic clamp 6 via pipe 6a, and in like manner, check valve 17 is connected to clamp 10, check valve 18 with clamp 8, check valve 19 with clamp 7, and check valve 20 with clamp 9. Check valve 21 is connected to hydraulic work support 23.

OPERATION

After part 30 is placed on base 5a of the fixture, fluid under pressure is supplied to the self-sealing coupling 13. It is forced open, and the fluid flows first through inlet check valve 13 to check valve 15 and thence to the hydraulic chuck 11. The chuck is forced into engagement with the part, thereby locating it in the proper position on base 5a. A restriction 22 in the supply line 14 delays the flow of fluid through the rest of the system until the chuck has been fully actuated. As pressure builds up in the balance of the system, each of the hydraulic clamps 6 through 10 is forced into secure engagement with the part 30, symbolically designated by circle 30a in FIG. 2, as noted earlier. The clamps, located about the periphery of the part, prevent any movement relative to the fixture.

As the source of fluid is disconnected from the coupling, it automatically shuts and prevents any reverse flow of fluid from the system. As added assurance, the inlet check valve 13 is provided. For loss of fluid to occur, both the coupling 12 and the inlet check valve 13 would have to leak, which would be highly unlikely. The system, therefore, remains charged with fluid under high pressure, and the part and associated fixture can be safely moved as an entity from work station to work station and the part undergo successive machining operations. During certain operations, the fixture and part are rotated at speeds up to 300 revolutions per minute. Since a typical part may weigh 300–500 pounds, and the fixture itself as much as 3000 pounds, the polar moment of inertia may be very substantial. Notwithstanding the large forces involved, experience has shown that the clamping system will hold the part securely.

The check valves 16 through 20, associated with the hydraulic clamps, provide an additional measure of protection. In the unlikely event that a clamp should leak fluid and release the pressure from supply pipe 14 or the supply pipe itself leak, the fluid in the other clamps could not flow back through their associated check valves to the supply line. Thus, all the other clamps would remain in secure engagement with the part and prevent damage to it or personnel operating the machine tools. The fail-safe characteristics of the system make it feasible to employ the fluid in supply pipe 14 for other purposes, such as actuating hydraulic load supports, one of which has been shown at 23 for illustrative purposes. Once again, the load support is isolated from the balance of the system by an associated check valve 21. Thus, failure of the load support would not place the clamping system in any jeopardy. This is a valuable attribute of the system since it is highly desirable to use a multiplicity of such supports to help bear the weight of the part on the fixture.

After the last machining operation has been completed, the part can be released from its fixture by relieving the fluid pressure in the system. This is best done by attaching a hose (not shown) to the coupling 12 which forces its self-sealing check valve off its seat. The pressure can then be dropped in the rest of the system by manually forcing the check valves 13 and 15–21 into an open position by use of control handles 13a and 15a–21a. When the pressure has been fully relieved, the hose can be disconnected, and the fixture can be returned to its point of origin for reuse in holding another part to be machined.

Since no human judgement is required to locate or tighten the clamps, the system described is reliable and safe to use. Parts can be quickly and accurately mounted on fixtures at a low cost in time and labor.

The present invention has been particularly described with reference to use of hydraulic fluid under pressure. Although it could also be designed as a pneumatic system, such a configuration would require the use of bulky accumulators and be more difficult to seal against fluid leakage.

COMPONENTS

All of the hydraulic components of the system as described are commercially available. Those used in the preferred embodiment of the invention can be obtained from the Enerpac Division of Applied Power Inc., Butler, Wisc. 53007. Refer to Enerpac Catalog No. E-312 for more specific information.

CONCLUSION

From the foregoing description of the preferred embodiment of the invention, it will be understood that it may be used to advantage wherever parts must be secured to fixtures to facilitate transportation to a multiplicity of work stations for successive machining operations. It is safe and convenient to use and promotes accuracy and economy of such operations.

According to the above description, the following invention is claimed as novel and is desired to be secured by Letters Patent of the United States.

I claim:

1. A fixture utilizing a system of hydraulic mechanisms for holding a part to be machined, said system comprising:
    a base;
    a hydraulic chuck mounted on said base for positioning the part relative to said base;
    a plurality of hydraulically actuated clamps mounted on said base for securing the part to said base;
    means for conveying hydraulic fluid under pressure to actuate said chuck and each of said clamps; and
    a plurality of check valves operatively associated with said hydraulic chuck and with each of said hydraulic clamps to isolate each mechanism from the other.

2. A fixture as described in claim 1 in which said means comprises an inlet check valve and a supply pipe, said supply pipe being connected between said inlet check valve and each of said plurality of check valves associated with said hydraulic chuck and said hydraulically actuated clamps.

3. A fixture as described in claim 2 further comprising:
    means for restricting flow of fluid in said supply pipe between said check valve associated with said hydraulic chuck and the rest of said check valves associated with said hydraulically actuated clamps.

4. A fixture as described in claim 3 further comprising:
    means associated with said inlet check valve and each of said plurality of check valves to relieve the pressure of the fluid from said hydraulic chuck and said hydraulic clamps.

5. A fixture as described in claim 4 further comprising:
    a self-sealing coupling for conveying fluid under pressure to said inlet check valve.

6. A clamping system for securing a part to be machined to the base of a fixture comprising:
    a plurality of hydraulically actuated clamps, mounted on the base, for securing the part to the base when actuated by fluid under pressure;
    a plurality of check valves, one said check valve being in fluid communication with each of said hydraulically actuated clamps;
    an inlet check valve; and
    piping for conveying fluid under pressure to said inlet check valve and thence to said plurality of check valves and their associated hydraulically actuated clamps.

7. A hydraulic clamping system as described in claim 6 further comprising:
    a self-sealing coupling through which fluid under pressure is conveyed to said inlet check valve.

* * * * *